United States Patent
Govindarajeswaran et al.

(10) Patent No.: US 9,600,335 B2
(45) Date of Patent: *Mar. 21, 2017

(54) METHOD AND SYSTEM FOR EFFICIENT EXECUTION OF ORDERED AND UNORDERED TASKS IN MULTI-THREADED AND NETWORKED COMPUTING

(71) Applicant: Wipro Limited, Bangalore (IN)

(72) Inventors: Maheshwaran Govindarajeswaran, Chennai (IN); Arun Jeyaprasad Arjun Jeyarani, Chennai (IN)

(73) Assignee: WIPRO LIMITED, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,641

(22) Filed: Nov. 20, 2015

(65) Prior Publication Data

US 2016/0077874 A1 Mar. 17, 2016

Related U.S. Application Data

(63) Continuation of application No. 14/089,685, filed on Nov. 25, 2013, now Pat. No. 9,207,978.

(30) Foreign Application Priority Data

Oct. 9, 2013 (IN) .......................... 4584/CHE/2013

(51) Int. Cl.
*G06F 9/45* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS 5,832,262 A * 11/1998 Johnson ................ G06F 9/4887
718/100
7,454,659 B1 * 11/2008 Gaudette ............. G06F 11/3664
714/33

(Continued)

OTHER PUBLICATIONS

F. Bachmann, "Illuminating the Fundamental Contributors to Software Architecture Quality", Technical Report CMU/SEI-2002-TR-025 (2002).

*Primary Examiner* — Dong Kim
(74) *Attorney, Agent, or Firm* — Finnegan, Henderson, Farabow, Garrett & Dunner, L.L.P.

(57) ABSTRACT

The present disclosure provides methods for concurrently executing ordered and unordered tasks using a plurality of processing units. Certain embodiments of the present disclosure may store the ordered and unordered tasks in the same processing queue. Further, processing tasks in the processing queue may comprise concurrently preprocessing ordered tasks, thereby reducing the amount of processing unit idle time and improving load balancing across processing units. Embodiments of the present disclosure may also dynamically manage the number of processing units based on a rate of unordered tasks being received in the processing queue, a processing rate of unordered tasks, a rate of ordered tasks being received in the processing queue, a processing rate of ordered tasks, and/or the number of sets of related ordered tasks in the processing queue. Also provided are related systems and non-transitory computer-readable media.

18 Claims, 5 Drawing Sheets

(56) References Cited

U.S. PATENT DOCUMENTS

| | | |
|---|---|---|
| 7,991,847 B2 | 8/2011 | Cadoret et al. |
| 8,015,256 B2 | 9/2011 | Pacheco |
| 2003/0060898 A1* | 3/2003 | Jenkins ............... G06F 9/52 700/2 |
| 2003/0110230 A1 | 6/2003 | Holdsworth et al. |
| 2003/0158883 A1 | 8/2003 | Drudis et al. |
| 2004/0187112 A1* | 9/2004 | Potter, Jr. ............ G06F 9/4843 718/100 |
| 2005/0257221 A1* | 11/2005 | Inchingolo .......... G06Q 10/06 718/100 |
| 2008/0263564 A1 | 10/2008 | Gambino |
| 2010/0179994 A1 | 7/2010 | Bittles et al. |
| 2011/0202924 A1* | 8/2011 | Banguero ............ G06F 9/4887 718/103 |
| 2011/0265068 A1 | 10/2011 | Elnozahy et al. |
| 2012/0117075 A1* | 5/2012 | Gokulakannan .. G06F 17/30445 707/741 |
| 2013/0125127 A1* | 5/2013 | Mital ................... G06F 9/46 718/102 |

\* cited by examiner

METHOD AND SYSTEM FOR EFFICIENT EXECUTION OF ORDERED AND UNORDERED TASKS IN MULTI-THREADED AND NETWORKED COMPUTING

RELATED APPLICATIONS

This application claims priority under 35 U.S.C. §119 to Indian Application 4584/CHE/2013 filed Oct. 9, 2013. The aforementioned application is incorporated herein by reference in its entirety.

DESCRIPTION

Over the past sixty years, the use of computing devices to perform large-scale calculations has become an integral force in almost all technology sectors. Over much of that time, the paradigm of computing has largely adhered to a serial execution model in which calculations are performed sequentially until a desired solution has been achieved. Archetypal problems falling into this paradigm include iterative solutions to non-linear differential equations such the determination of solutions for many-body problems in Newtonian and non-Newtonian systems. Serial execution is also the manner in which humans have naturally approached most problems including, for example, the familiar algorithms for long division or for multiplication taught to young elementary-school students. A hallmark of serial execution has been the reliance of subsequent calculations on solutions determined by earlier calculations. This reliance implies the need for serial execution because, without the solution obtained in an initial phase, a later phase is unable to begin.

But as problems in computing have become ever larger and more massive—to the point where the amount of computing time needed by a state-of-the art hardware processor to arrive at a solution often exceeds the average human lifespan—there has been a shift to parallel or concurrent execution models, also known as parallel processing. For example, graphics processing is one domain in which concurrent execution has led to huge advances. Electronic displays, e.g., LED computer screens have resolutions on the order of millions of pixels. The calculation of each pixel's hue, color, etc. at frequencies often in excess of 30 Hz is a massive problem that has now become routine thanks to Graphics Processing Units (GPUs) capable of concurrently executing the needed calculations for each pixel using specialized processors. In a serial execution model, the calculation of each pixel would be sequentially calculated, one after the other, requiring millions of steps. But in a concurrent execution model, the calculation of each pixel occurs at the same time, essentially in a single step. The predicate condition enabling this enormous speed up is that the calculations needed for each pixel do not rely on the solutions obtained for other pixels. Thus, concurrent execution takes advantage of the observation that large problems can often be broken into many smaller problems, each of which can be solved independently of the others.

Within the field of parallel computing, two main paradigms of concurrent execution have emerged. In a "shared memory" model, different processors are capable of reading and writing to the same location in computer memory. In this model, parallel processing can be achieved by placing multiple hardware processors in communication with the same memory space, or by using execution "threads"—a feature common in many modern operating systems—which can take advantage of multithreaded or multicore hardware processors. Alternatively, processors may be allocated exclusive areas of memory, either on the same physical hardware memory, multiple physically exclusive hardware memory modules, or a combination thereof. In this second model, some form of communication is necessary between processors, usually achieved using processor interconnects or networking protocols, e.g., Ethernet or HTTP. Thus one term for this model of parallel processing is "message passing." Hybrid implementations using elements of both shared memory and message passing have also been used to achieve concurrent execution.

Algorithms in the parallel processing space have sought to address a recurrent set of technical issues. One common theme among these issues is the problem of data synchronization. Though the parallel calculations performed by each processor in a parallel processing algorithm may be performed independently, the division of those calculations from a larger problem often depends on the nature of the larger problem as a whole—more fundamentally, many large problems of interest cannot be neatly divided into wholly independent pieces and, thus, require a great deal of data management. The individual solutions obtained must also often be recombined in some fashion in order to achieve a comprehensible solution to the larger problem. Another theme concerns the problem of resource allocation or load balancing. One aspect of this problem relates simply to the number of processors available to tackle a set of parallel calculations. Another aspect relates to variations in complexity of individual parallel calculations as well as the throughput of the individual processors. Stated differently, each calculation in a set of parallel calculations may require longer or shorter periods of computing time. Because the overall speed of parallel calculation is often limited to the speed of the slowest processor (or the processor requiring the most computing time), effective parallel processing seeks to minimize processor idle time. This is generally accomplished by distributing the set parallel calculations evenly among the available processors.

Data synchronization and load balancing issues are both present in a situation where the set of parallel processing tasks comprises unordered tasks and ordered tasks. Unordered tasks may be processed by any available processor without regard to the order they are processed. To process a set of ordered tasks, however, requires each ordered task to be processed in a given sequence relative to other ordered tasks in the set. Because of the serial nature of ordered task processing, independence of the tasks cannot be assumed. Accordingly, algorithms for processing ordered and unordered tasks must ensure that processors do not process tasks out of order (data synchronization), while at the same time minimizing the time that processors wait for each other to finish processing earlier ordered tasks (load balancing). One solution to this problem has been the use of multiple data structures. For example, unordered tasks may be assigned to one data structure, while ordered tasks may be assigned to one or more additional data structures (e.g., one set of related ordered tasks per data structure). In this scenario the unordered-task data structure may be simultaneously processed by multiple processors, but ordered-task data structure(s) may be assigned only one processor at a time, thereby precluding out-of-order processing. The use of memory "locks" presents another solution by preventing processors from writing to same memory location(s) currently being accessed by other processors. Yet another solution entails the use of "delay," in which processors are kept deliberately idle. The use of delays thereby ensures sufficient time for processors to complete, their tasks before receiving additional tasks.

These solutions, however, do not adequately address issues of data synchronization and load balancing. Furthermore, these solutions are not sensitive to the dynamic mix of unordered and ordered tasks, e.g., the proportion of unordered tasks relative to the total number of tasks, the ratio of unordered tasks to ordered tasks, etc., which may change over time. Ignorance of this factor leads to wasted computer resources, disruption of information technology services, time, and money. Thus, additional solutions are desired.

SUMMARY

Embodiments of the present disclosure provide methods for concurrently executing ordered and unordered tasks using a plurality of processing units. In some embodiments, such a method may comprise receiving an unordered task or an ordered task into a processing queue and processing the task in the processing queue using at least one processing unit. If the task is an unordered task or an ordered task with no other processing unit processing a related ordered task, the processing unit may processes the task. If the task is an ordered task and another processing unit is processing a related ordered task, the processing unit may preprocess the ordered task if the ordered task needs preprocessing. The method may also comprise dynamically managing the number of processing units. In certain embodiments, the ordered and unordered tasks may be stored in the same processing queue. The processing queue may comprise a linear data structure. The processing unit may comprise a hardware processor and/or a software processing unit, such as a thread. In certain embodiments, dynamically managing the number of processing units may comprise determining a required number of processing units based on at least one of a rate of unordered tasks being received in the processing queue, a processing rate of unordered tasks, a rate of ordered tasks being received in the processing queue, a processing rate of ordered tasks, and the number of sets of related ordered tasks in the processing queue. The method may also include adjusting the number of processing units based on the required number of processing units. The required number of processing units ($rT_n$) may be equal to the lesser of $MT_n$ or $uOT_n+OT_n$, wherein $MT_n$ is a maximum number of processing units, $uOT_n=(f-x) \times uOT_{Thresh}$, f is the rate of unordered tasks being received in the processing queue, x is the processing rate of unordered tasks, and $uOT_{Thresh}$ is a threshold number of processing units per unordered task, and $OT_n$ is determined based on values of $pT_n$, $epT_n$, and $uK_c$, wherein $pT_n=pM_n \times OT_{Thresh}$, wherein $pM_n$ a number of tasks to be preprocessed concurrently and $OT_{Thresh}$ is a threshold number of processing units per ordered task, wherein $epT_n=(z-y) \times OT_{Thresh}$, wherein z is the rate of ordered tasks being received in the processing queue, y is the processing rate of ordered tasks, and $uK_c$ corresponds to the number of sets of related ordered tasks in the processing queue, and $OT_n$ is equal to the greater of $pT_n$ and $epT_n$ if $pT_n \neq 0$, or $OT_n$ is equal to lesser of $epT_n$ and $uK_c$ if $pT_n=0$.

Embodiments of the present disclosure also provide systems for executing ordered and unordered tasks. According to some embodiments, such a system may comprise one or more hardware processors configured to execute instructions stored in a computer-readable medium. The one or more hardware processors may be configured to receive an unordered task or an ordered task into a processing queue and process the task using at least one processing unit. If the task is an unordered task or an ordered task with no other processing unit processing a related ordered task, the processing unit may process the task. If the task is an ordered task and another processing unit is processing a related ordered task, the processing unit may preprocess the ordered task if the ordered task needs preprocessing. The one or more hardware processors may be further configured to dynamically manage the number of processing units. In certain embodiments, the ordered and unordered tasks may be stored in the same processing queue. The processing queue may comprise a linear data structure. The processing unit may comprise a hardware processor and/or a software processing unit, such as a thread. In certain embodiments, dynamically managing the number of processing units may comprise determining a required number of processing units based on at least one of a rate of unordered tasks being received in the processing queue, a processing rate of unordered tasks, a rate of ordered tasks being received in the processing queue, a processing rate of ordered tasks, and the number of sets of related ordered tasks in the processing queue. Managing the number of processing units may also comprise adjusting the number of processing units based on the required number of processing units. The required number of processing units ($rT_n$) may be equal to the lesser of $MT_n$ or $uOT_n+OT_n$, wherein $MT_n$ is a maximum number of processing units, $uOT_n=(f-x) \times uT_{Thresh}$, wherein f is the rate of unordered tasks being received in the processing queue, x is the processing rate of unordered tasks, and $uOT_{Thresh}$ is a threshold number of processing units per unordered task, and $OT_n$ is determined based on values of $pT_n$, $epT_n$, and $uK_c$, wherein $pT_n=pM_n \times OT_{Thresh}$, wherein $pM_n$ is a number of tasks to be preprocessed concurrently and $OT_{Thresh}$ is a threshold number of processing units per ordered task, wherein $epT_n=(z-y) \times OT_{Thresh}$, z is the rate of ordered tasks being received in the processing queue, y is the processing rate of ordered tasks, and $uK_c$ corresponds to the number of sets of related ordered tasks in the processing queue, and $OT_n$ is equal to the greater of $pT_n$ and $epT_n$ if $pT_n \neq 0$, or $OT_n$ is equal to lesser of $epT_n$ and $uK_c$ if $pT_n=0$.

Embodiments of the present disclosure also relate to non-transitory computer-readable mediums storing instructions for executing ordered and unordered tasks. Upon execution of the instructions by one or more hardware processors, the one or more hardware processors may be configured by the instructions to receive an unordered task or an ordered task into a processing queue. The one or more hardware processors may be further configured to process the task in the processing queue using at least one processing unit. If the task is an unordered task or an ordered task with no other processing unit processing a related ordered task, the processing unit may processes the task. If the task is an ordered task and another processing unit is processing a related ordered task, the processing unit may preprocess the ordered task if the ordered task needs preprocessing. The one or more hardware processors may be further configured to dynamically manage the number of processing units. In certain embodiments, the ordered and unordered tasks may be stored in the same processing queue. The processing queue may comprise a linear data structure. In certain embodiments, dynamically managing the number of processing units may comprise determining a required number of processing units based on at least one of a rate of unordered tasks being received in the processing queue, a processing rate of unordered tasks, a rate of ordered tasks being received in the processing queue, a processing rate of ordered tasks, and the number of sets of related ordered tasks in the processing queue. Managing the number of processing units may also include adjusting the number of processing units based on the required number of processing units. The required number of processing units ($rT_n$) may be equal to the lesser of $MT_n$ or $uOT_n+OT_n$, wherein $MT_n$ is a maximum number of processing units, $uOT_n=(f-x) \times uOT_{Thresh}$, wherein f is the rate of unordered tasks being received in the processing queue, x is the processing rate of unordered tasks, and $uOT_{Thresh}$ is a threshold number of processing units per unordered task, and $OT_n$ is determined based on values of $pT_n$, $epT_n$, and $uK_c$, wherein $pT_n=pM_n \times OT_{Thresh}$, wherein $pM_n$ is a number of tasks to be preprocessed concurrently and $OT_{Thresh}$ is a threshold number of processing units per ordered task, wherein $epT_n=(z-y) \times OT_{Thresh}$, z is the rate of ordered tasks being received in the processing queue, y is the processing rate of ordered tasks, and $uK_c$ corresponds to the number of sets of related ordered tasks in the processing queue, and $OT_n$ is equal to the greater of $pT_n$ and $epT_n$ if $pT_n \neq 0$, or $OT_n$ is equal to lesser of $epT_n$ and $uK_c$ if $pT_n=0$.

The present disclosure also relates to methods for dynamically managing processing units concurrently processing ordered tasks and unordered tasks stored in processing queue. In some embodiments, such a method may comprise determining a required number of processing units based on at least a rate of unordered tasks being received in the processing queue, a processing rate of unordered tasks, a rate of ordered tasks being received in the processing queue, a processing rate of ordered tasks, and the number of sets of related ordered tasks in the processing queue. The method may also include adjusting the number of processing units based on the required number of processing units. The required number of processing units ($rT_n$) may be equal to the lesser of $MT_n$ or $uOT_n+OT_n$, wherein $MT_n$ is a maximum number of processing units, $uOT_n=(f-x) \times uOT_{Thresh}$, f is the rate of unordered tasks being received in the processing queue, x is the processing rate of unordered tasks, and $uOT_{Thresh}$ is a threshold number of processing units per unordered task, and $OT_n$ is determined based on values of $pT_n$, $epT_n$, and $uK_c$, wherein $pT_n=pM_n \times OT_{Thresh}$, wherein $pM_n$ is a number of tasks to be preprocessed concurrently and $OT_{Thresh}$ is a threshold number of processing units per ordered task, wherein $epT_n=(z-y) \times OT_{Thresh}$, wherein z is the rate of ordered tasks being received in the processing queue, y is the processing rate of ordered tasks, and $uK_c$ corresponds to the number of sets of related ordered tasks in the processing queue, and $OT_n$ is equal to the greater of $pT_n$ and $epT_n$ if $pT_n \neq 0$, or $OT_n$ is equal to lesser of $epT_n$ and $uK_c$ if $pT_n=0$.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings.

DETAILED DESCRIPTION

As used herein, reference to an element by the indefinite article "a" or "an" does not exclude the possibility that more than one of the element is present, unless the context clearly requires that there is one and only one of the elements. The indefinite article "a" or "an" thus usually means "at least one." The disclosure of numerical ranges should be understood as referring to each discrete point within the range, inclusive of endpoints, unless otherwise noted.

Embodiments in accordance with the present disclosure provide methods, systems, and non-transitory computer-readable media capable of receiving an unordered task or an ordered task into a processing queue; and processing a task in the processing queue using at least one processing unit. If the task is an unordered task or an ordered task with no other processing unit processing a related ordered task, the processing unit processes the task. But if the task is an ordered task and another processing unit is processing a related ordered task, the processing unit preprocesses the ordered task if the ordered task needs preprocessing. The number of processing units is also dynamically managed. Thus, embodiments in accordance with the present disclosure do not require the use of multiple processing queues to store the unordered and ordered tasks and, in certain embodiments, do not require the use of lock and/or delay mechanisms. In a scenario where an ordered task may comprise a preprocessing phase that may be executed out of order and/or without regard to the execution of other related ordered tasks, embodiments in accordance with the present disclosure enable concurrent preprocessing of ordered tasks, thus reducing the amount of processing unit idle time and improving load balancing across available processing units. By dynamically managing the number of processing units, embodiments of the present disclosure may also conserve computational resources. The following detailed description, along with the accompanying drawings, serve to illustrate one implementation of an embodiment in accordance with the present disclosure. Variations of following detailed description should considered within the scope of the present disclosure.

Figure 1:
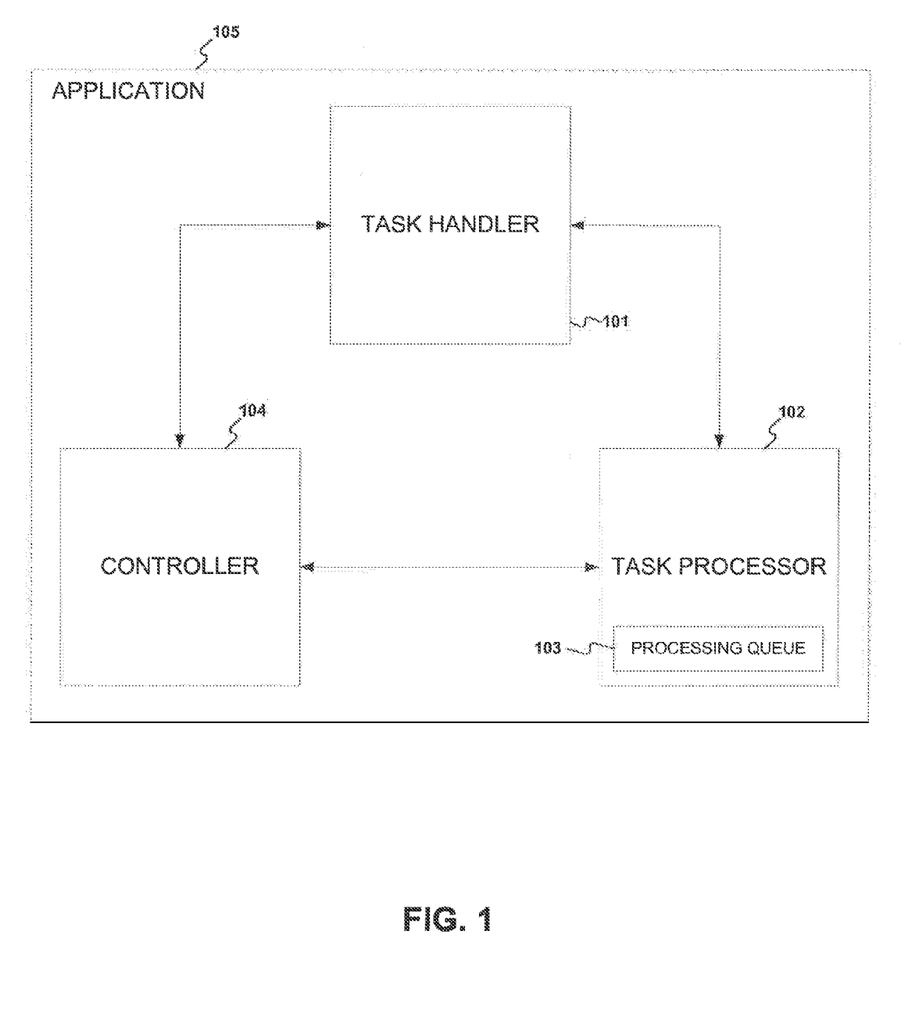
FIG. 1 is a schematic representation of an embodiment in accordance with the present disclosure, illustrating a task handler, a task processor having a processing queue, and a controller.

FIG. 1 is a schematic representation of an embodiment in accordance with the present disclosure, illustrating a task handler 101, a task processor 102 having a processing queue 103, and a controller 104. The forgoing components may operate within an application 105. Task handler 101 receives unprocessed tasks, e.g., unordered tasks and ordered tasks, and may perform initial processing to add received unprocessed tasks to processing queue 103 in task processor 102. Initial processing may include providing information to controller 104 for managing task processing. Task processor 102 processes the unprocessed tasks in processing queue 103. Thus, the inputs and outputs of embodiments consistent with the present disclosure include unprocessed tasks and processed tasks, respectively. Processing tasks may include providing information to controller 104 for managing task processing. Controller 104 may monitor parameters related to task processing such as: inflow of unordered/ordered tasks into processing queue 103, outflow of processed unordered/ordered tasks, time elapsed, number of processing units available to the task processor, processor idle time, etc. Controller 104 may also manage the number of processing units used by task processor 102 to process tasks in the processing queue 103. It is noted that, although shown as separate components in FIG. 1, the division between the task handler 101, task processor 102, and controller 103 is purely illustrative, and the management and execution of the various functionalities consistent with the present disclosure may be shared or otherwise redistributed. Application 105 may include various applications that require processing of ordered and unordered tasks, e.g., an element management system receiving events and alarms from various network elements requiring ordered processing for the alarms and unordered processing for the events. Thus, task handler 101, task processor 102 including processing queue 103, and controller 104, may be adapted to different applications. It should be understood that the specific steps taken by a processing unit to process an ordered/unordered will vary depending on the application. Implementation of the present disclosure may be accomplished independently of implementation of those specific steps by using, for example, object-oriented programming techniques and/or application programming interfaces known to those of skill in the art.

Figure 2:
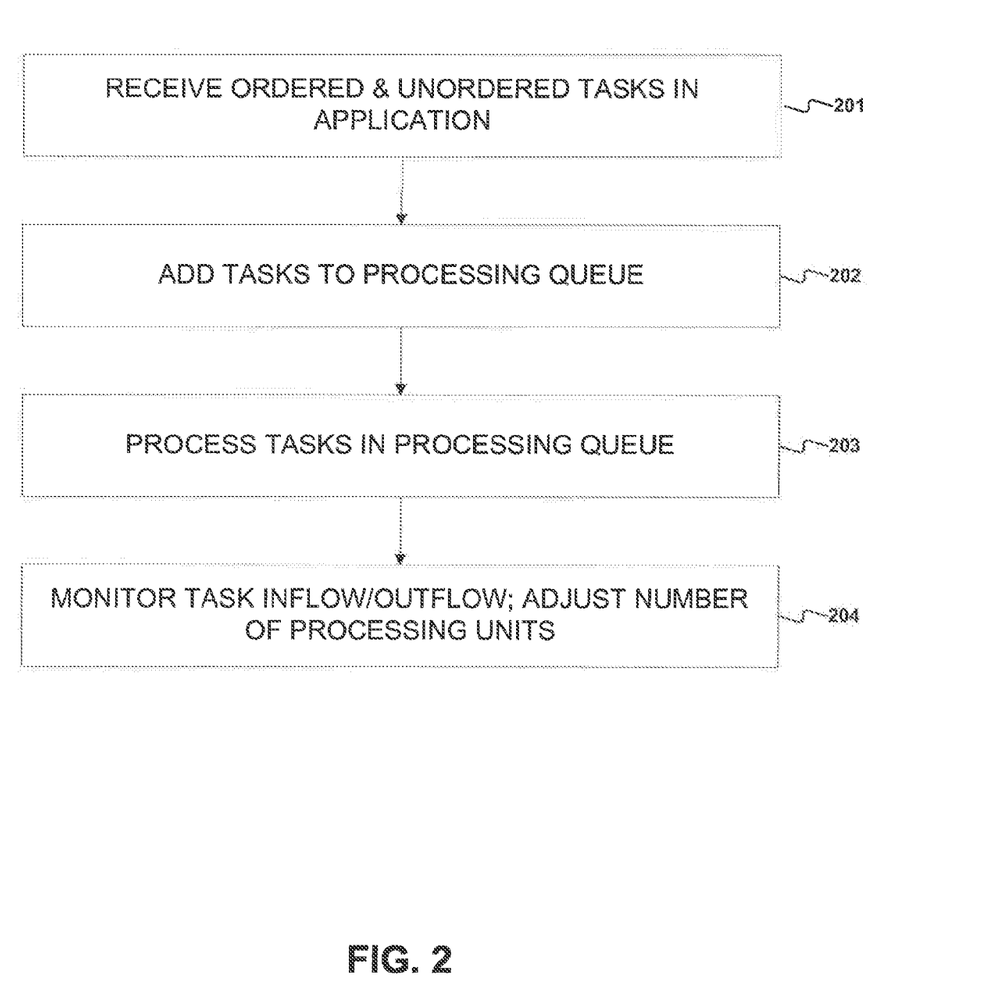
FIG. 2 illustrates a high-level overview of an exemplary method for processing ordered and unordered tasks in accordance with the present disclosure.

FIG. 2 illustrates a high-level overview of an exemplary method for processing ordered and unordered tasks in accordance with the present disclosure. The illustrated method includes step 201 in which ordered and unordered tasks are received in an application, e.g., application 105. In step 202, the tasks are added to a processing queue, e.g., processing queue 103. Processing queue 103 may comprise various data structures, e.g., a stack, a linked list, a doubly-linked list, a tuple, a ring, a two dimensional array, a multi-dimensional array, a tree, a binary tree, etc. In certain embodiments, processing queue 103 may comprise a linear data structure, such as a stack, a linked list, a doubly-linked list, a ring etc., in which the order of tasks may be preserved based on the order of their insertion/addition to processing queue 103, e.g., FIFO (first in first out) or FILO (first in last out). Thus, in certain embodiments where ordered tasks received in application 105 and/or task handler 101 are to be processed based on the order they were received, processing queue 103 may comprise a linear data structure such as a FIFO linked list. Certain embodiments in accordance with the present disclosure may use only one data structure, which may be a FIFO data structure such as a FIFO linked list storing both ordered tasks and unordered tasks.

The tasks are then processed in step 203, for example, in task processor 102, using a plurality of processing units. In certain embodiments or scenarios, only one processing unit may be used—for example, when processing queue 103 has very few tasks, controller 104 may reduce the number of processing units available to task processor 102. Even in this case, however, embodiments consistent with the present disclosure retain the capability of using more than one processing unit. Processing units may include hardware processors, e.g., central processing units (CPUs) found in most computer hardware or specialized chips such a GPUs. Processing units may also include software processing units, e.g., execution "threads," including operating-system threads, which may take advantage of multithread/multicore hardware processing units. Combinations of hardware processors and software process units may also be used, e.g., a combination of multicore hardware processors each providing multiple execution threads.

Monitoring of task processing, including task inflow/outflow and adjusting the number of processing units occurs in step 204, which may be carried out by controller 104, as discussed above. As discussed above, controller 104 may monitor parameters related to task processing such as inflow of unordered/ordered tasks into processing queue 103, outflow of processed unordered ordered tasks, time elapsed, number of processing units available to the task processor, processor idle time, etc. Such information may be reported by task handler 101 and/or task processor 102 using notifications, or may be obtained by controller 104 via querying appropriate locations in shared memory or message passing.

Importantly, though shown as sequential in FIG. 2 for representational convenience, steps 201, 202, 203, and 204 may occur simultaneously in a concurrent execution environment through, for example, the concerted action of the components shown in FIG. 1. Thus, application 105 and/or task handler 101 may continuously receive ordered/unordered tasks, perform initial processing, and add tasks to processing queue 103. At the same time, task processor 102 may continuously process tasks in processing queue 103 using one or more processing units. Processing queue 103 may accordingly have tasks continuously being added and removed as new tasks are received and processed.

Figure 3:
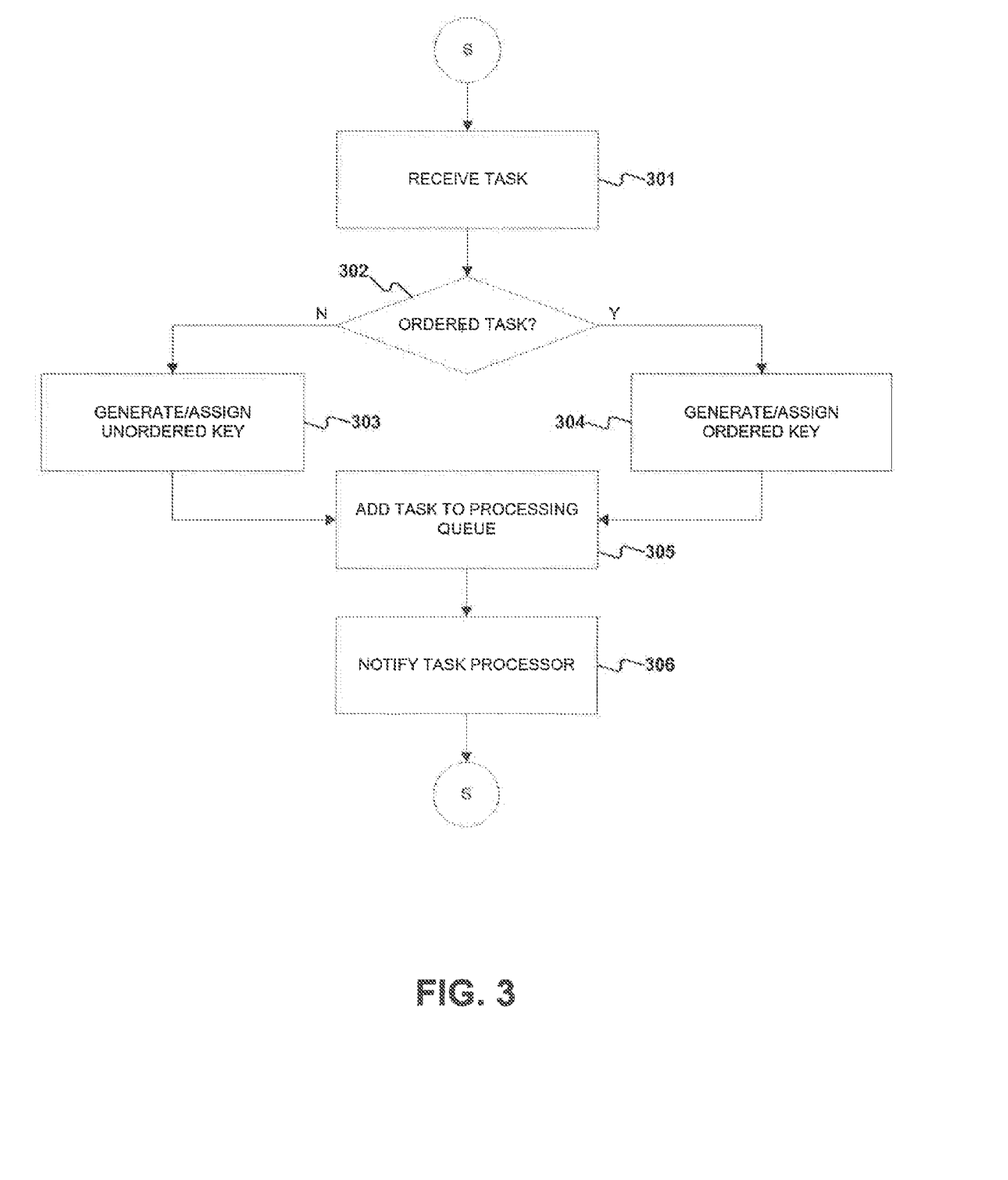
FIG. 3 is a flowchart illustrating an exemplary method for receiving tasks in the processing queue in accordance with the present disclosure.

FIG. 3 is a flowchart illustrating an exemplary method for receiving tasks in the processing queue and performing initial processing of received tasks, consistent with the present disclosure. In step 301, for example, task handler 101 may receive an ordered or unordered task. In step 302, task handler 101 may determine whether the task is an ordered task or an unordered task. Determining whether a task is ordered or unordered may be carried out by querying meta-data associated with the task, by the nature of the task itself (e.g., object type), a notification from source originating the task, etc. For example, in an element management system where tasks are either events (unordered) or alarms (ordered), task handler 101 may determine whether a task is ordered or unordered from the type of task received or by querying an appropriate memory location storing meta-data identifying the task's type (in this example, either as an event or an alarm, or as ordered or unordered), or by receiving a notification from the element management system. If the task is an unordered task (step 302; NO), task handler 101 may generate and/or assign the task an unordered key in step 303. Task handler 101 may also add the task to processing queue 304 in step 305 (by, e.g., using functions associated with data structures, such as adding or inserting), notify task handler 102 that a new task is available for processing (step 306). The process may then become repeated by returning to step 301. If the task is the ordered task (step 302; YES), task handler 101 may generate and/or assign an ordered key in step 304. An ordered key may include information regarding which other ordered tasks (which may or may not present in processing queue 103) are related to the received ordered task, and/or the order that the related ordered tasks must be processed. To illustrate the role of unordered and ordered keys, an elementary example is now provided. In this example, the order that ordered tasks are to be processed is determined based the order they are received by task handler 101 and the processing queue comprises a FIFO linked list. All unordered tasks may be provided an unordered key "*", a first set of related ordered tasks may be provided key "A", and a second set of ordered tasks provided key "B."

In certain embodiments, along with generating or assigning an ordered key in step 304, task handler 101 may also determine if the received ordered task requires preprocessing and provide an indication regarding the same by, for example, adding meta-data or marking the ordered task as requiring preprocessing. It also contemplated that certain embodiments in accordance with the present disclosure may not require unordered keys to be assigned in step 303, e.g. the absence of a key may be used to determine that the task is an unordered task; in the case where no unordered keys are assigned, task handler 101 may proceed directly from step 302 to step 305 if the received task in step 301 is an unordered task.

In certain embodiments, the steps in FIG. 3 may be performed in a serial execution model in which all tasks received may be initially processed and added to processing queue 103 in the order they are received. The method illustrated in FIG. 3, however, may also be used in an embodiment amenable to parallel execution where multiple processing units may perform initial processing and queue multiple tasks simultaneously. Parallel execution of the method of FIG. 3 by multiple processing units may require the use of lock and/or delay mechanisms to prevent race conditions in processing queue 103, duplication of received tasks, etc. In this embodiment, ordered keys generated in step 304 may comprise information regarding processing order because, even in the case where related ordered tasks are to be processed in the order they are received, they may not be added to processing queue 103, e.g., a FIFO linked list, in that order.

Figure 4:
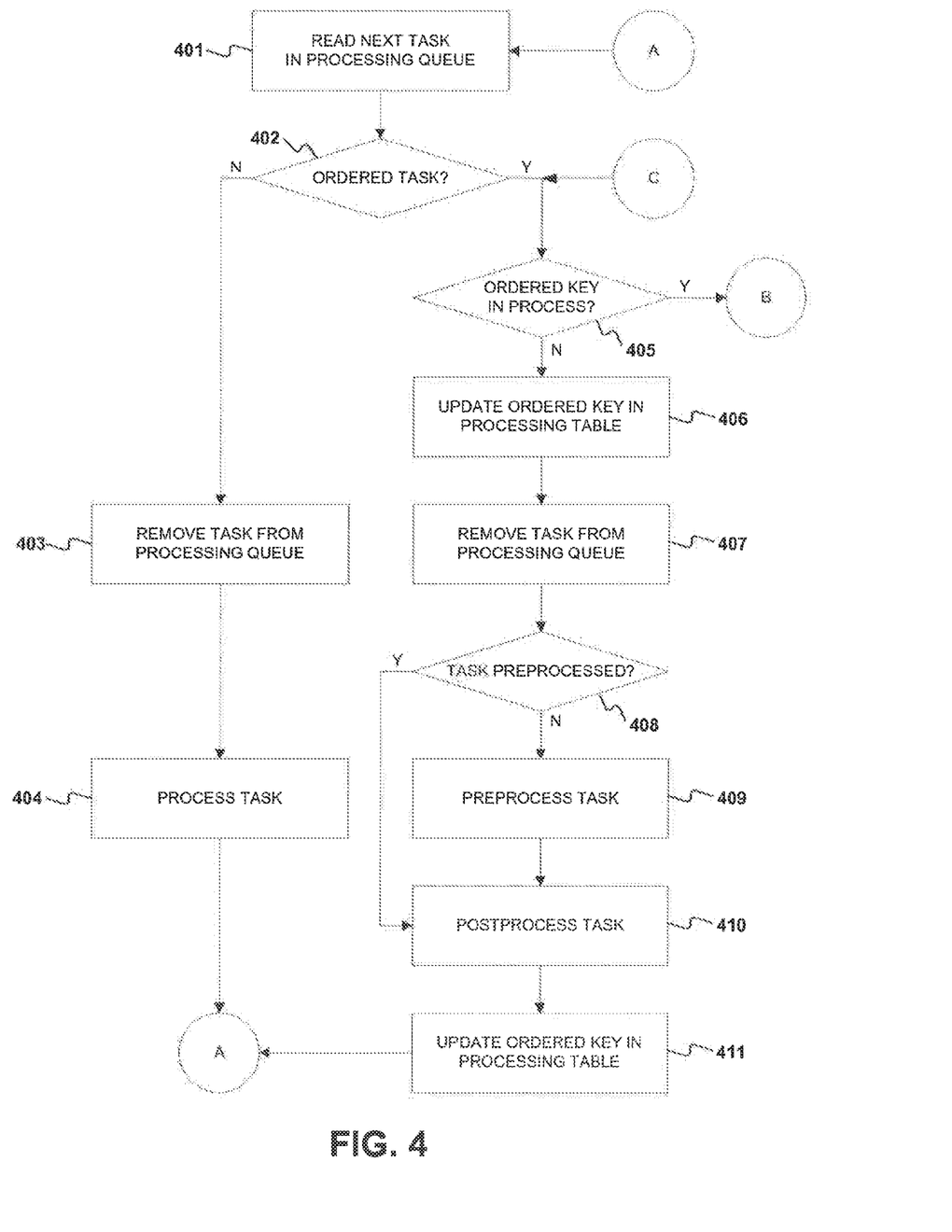
FIG. 4 is a flowchart illustrating an exemplary method for processing a task in the processing queue in accordance with the present disclosure.
Figure 5:
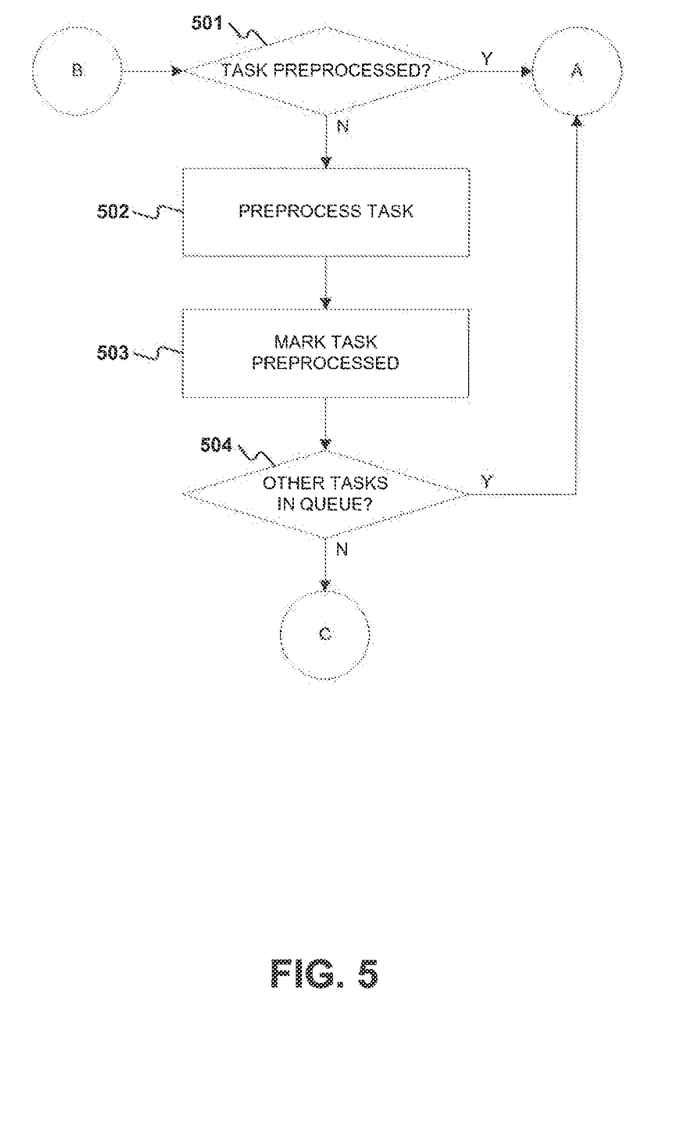
FIG. 5 is a flowchart providing an additional illustration of an exemplary method performed in accordance with the present disclosure as shown in FIG. 4.

FIG. 4, continued in FIG. 5, is a flowchart illustrating an exemplary method for processing a task in the processing queue in accordance with the present disclosure. The aforementioned illustrations and the following description of the foregoing embodiment are provided under the simplifying assumption that the ordered tasks in processing queue 103 are to be processed in the order they are added to the queue, and that the processing queue comprises a FIFO linked list data structure. Variations of the foregoing embodiment, however, are possible. For example, information regarding processing order may be encoded into the ordered key of related ordered tasks where the processing order of ordered tasks is not dictated by their positions in the data structure. Thus, ordered keys for one set of related ordered tasks may be "A1," "A2," "A3," and so on, and ordered keys for another set of ordered tasks may be "B1," "B2", "B3," and so on, such that the first character in an ordered key defines the set of related ordered tasks, while the second character of an ordered key defines the order in which the related ordered tasks are to be processed. A processing table indicating the status the ordered keys (e.g., as unprocessed, preprocessed, processed, being processed/in process etc.) may be also be used to the check the processing status of related ordered tasks and/or individual ordered tasks. The aforementioned illustrations and the following description of the foregoing embodiment have also assumed each ordered task to have a preprocessing phase and post-processing phase, where the preprocessing phase is capable of concurrent execution without regard to the processing order of related ordered tasks. Variation of the foregoing embodiment, however, is possible. For example, where not every ordered task has a preprocessing phase amenable to parallel execution, task handler 101 may determine whether an ordered task requires preprocessing during initial processing of the received tasks, as described above.

Beginning in FIG. 4, each processing unit available to task processor 102 may begin by reading the next task in processing queue 103 (step 401). Reading the next task may vary according the data structure of the processing queue. Under the assumption that processing queue 103 comprises a FIFO linked list, reading the next task in processing queue 103 may comprise, for example, reading a task at one of the list ends, depending on the particular implementation of the linked list. Next, in step 402, the processing unit may determine whether the task is an ordered task or an unordered task. Such determination may comprise determining whether the task was assigned an unordered key or an ordered key in the initial processing by task handler 101, as discussed above. Alternatively, the processing unit may determine whether the task is ordered or unordered using the same or similar techniques used in the initial processing by task handler 101, e.g., by querying meta-data associated with the task, by the nature of the task itself (i.e., object-type), a notification from source originating the task, etc. If the task is an unordered task (step 402; NO), the processing unit may remove the task from the processing queue and process it in steps 403 and 404, respectively. As described in FIG. 4, the processing unit may then return to reading the next task in processing queue 103 (step 401). After processing the unordered task from processing queue 103 in step 404, the processing unit may output the unordered task to, inter alia, application 105.

If the processing unit determines that the task is an ordered task (step 402; YES), it may determine whether to process the ordered task, preprocess the ordered task, or read the next task in the processing queue based on (i) whether a related ordered task is being processed and/or (ii) whether the ordered task has been preprocessed. Thus, in the implementation illustrated in FIG. 4, the processing unit may determine whether related ordered task is being processed (step 405). For example, the processing unit may check a processing table indicating the status of the ordered key assigned to the ordered task by task handler 101. If the processing table indicates that the ordered key is not being processed (step 405; NO), the processing unit may update the processing table in step 406 to indicate the ordered key as being processed, thereby preventing other processing units from processing related ordered tasks out of order. The processing unit may then remove the ordered task from processing queue 103 in step 407, and processes the ordered task by determining if the ordered task has been preprocessed (step 408), preprocessing the ordered task if the ordered task has not be preprocessed (step 409), and post-processing the task (step 410). The processing unit may determine if the ordered task has been preprocessed in step 408 by, for example, querying the appropriate memory location storing meta-data identifying whether the task has been preprocessed, e.g., whether the task has been marked as preprocessed. Having completed processing of the ordered task, the processing unit may update the processing table to indicate the ordered task as not being processed. As described in FIG. 4, the processing unit may then return to reading the next task in processing queue 103 (step 401). After processing the ordered task from processing queue 103 in step 410, the processing unit may also output the ordered task to, inter alia, application 105.

If the processing unit determines that a related ordered task is being processed (step 405; YES), the processing unit may attempt to preprocess the ordered task. In certain embodiments, the processing unit may determine that a related ordered task is being processed by checking the processing table indicating the status of the ordered key assigned to the ordered task by task handler 101 in step 405. Thus, as shown in FIG. 5, the processing unit may determine whether the ordered task has been preprocessed in step 501. The processing unit may determine if the ordered task has been preprocessed in step 501 by, for example, querying the appropriate memory location storing meta-data identifying whether the ordered task has been preprocessed, e.g., whether the task has been marked as preprocessed. If the ordered task has been preprocessed (step 501; YES), the processing unit then proceeds to read the next item in processing queue 103 in step 401, as shown in FIG. 4. If the ordered task has not been preprocessed (step 501; NO), the processing unit preprocesses the ordered task and marks the ordered task as preprocessed, e.g., by modifying the appropriate memory location storing meta-data identifying whether the ordered task has been preprocessed in steps 502 and 503, respectively. Then, if the processing unit determines that other tasks remain in processing queue 103 (step 504; YES), it proceeds to read the next task in step 401 of FIG. 4. If the processing unit determines that no other tasks remain in the processing queue (step 504; NO), it proceeds to determine if it can process the ordered task starting at step 405 in FIG. 4. The processing units used by task processor 102 thus concurrently process tasks in processing queue 103, wherein if the task being processed by a processing unit is an unordered task or an ordered task with no other processing unit processing a related ordered task, the processing unit processes the task, and if the task is an ordered task and another processing unit is processing a related ordered task, the processing unit preprocesses the ordered task if the ordered task needs preprocessing.

In parallel with the steps performed by task handler 101 and task processor 102 discussed above, controller 104 may dynamically manage the number of processing units. Controller 104 may dynamically manage the number of processing units by, for example, determining: a required number of processing units based on a rate of unordered tasks being received in processing queue 103, a processing rate of unordered tasks, a rate of ordered tasks being received in processing queue 103, a processing rate of ordered tasks, and/or the number of sets of related ordered tasks in processing queue 103. Controller 104 may also adjust the number of processing units based on the required number of processing units. Typically, however, application 105 operates in a runtime environment of finite resources and may only use a certain maximum number of processing units. For example, each application running in a typical modern operating system may be allocated on a certain number of execution threads. Thus there may be a maximum number of processing units available to process the unordered and ordered tasks in processing queue 103.

In certain embodiments, the required number of processing units ($rT_n$) is equal to the lesser of $MT_n$ or $uOT_n + OT_n$, wherein $MT_n$ is a maximum number of processing units (e.g., the maximum number of process units allocated to application 105). Moreover, $uOT_n = (f-x) \times uOT_{Thresh}$, wherein f is the rate of unordered tasks being received in processing queue 103, x is the processing rate of unordered tasks, and $uOT_{Thresh}$ is a threshold number of processing units per unordered task. $OT_n$ is determined based on values of $pT_n$, $epT_n$, and $uK_c$, wherein $pT_n = pM_n \times OT_{Thresh}$, wherein $pM_n$ is a number of tasks to be preprocessed concurrently and $OT_{Thresh}$ is a threshold number of processing units per ordered task. $epT_n = (z-y) \times OT_{Thresh}$, wherein z is the rate of ordered tasks being received in processing queue 103, y is the processing rate of ordered tasks, and $uK_c$ corresponds to the number of sets of related ordered tasks in processing queue 103. Finally, $OT_n$ is equal to the greater of $pT_n$ and $epT_n$ if $pT_n \neq 0$, or $OT_n$ is equal to lesser of $epT_n$ and $uK_c$ if $pT_n = 0$.

Parameters f, x, z, and y correspond to rates which may be obtained by dividing the relevant number of tasks, e.g., ordered/unordered tasks entering processing queue 103 over a certain time period, by the time period. For example, f may be obtained by determining the number of unordered tasks received in processing queue 103 over the course of a second. Because processed tasks may be removed from processing queue 103, x and y may also correspond to a rate of unordered tasks and ordered tasks, respectively, removed from processing queue 103. $rT_n$ may be limited to integer values by appropriately rounding (up or down) the final value of $rT_n$ to the nearest integer, or by appropriately rounding (up and/or down) intermediate parameters used to calculate $rT_n$ to the nearest integer.

As a proof of concept, the table below shows values of $uOT_n$ and $OT_n$ based on parameters y, x, z, $uK_c$, f, $pM_n$, $OT_{Thresh}$, $uOT_{Thresh}$, $OT_n$, and $uOT_n$.

| $y \left[\frac{task}{second}\right]$ | $x \left[\frac{task}{second}\right]$ | $z \left[\frac{task}{second}\right] : uK_c$ | $f \left[\frac{task}{second}\right]$ | $pM_n$ | $OT_{Thresh}$ | $uOT_{Thresh}$ | $OT_n$ | $uOT_n$ |
|---|---|---|---|---|---|---|---|---|
| 5 | 10 | 10:2 | 15 | 10 | 1/5 | 2/5 | 2 | 2 |
| 5 | 10 | 50:2 | 50 | 50 | 1/5 | 2/5 | 10 | 16 |
| 5 | 10 | 50:2 | 50 | 20 | 1/5 | 2/5 | 4 | 16 |
| 100 | 10 | 500:10 | 0 | 20 | 1/10 | 2/5 | 10 | 0 |
| 5 | 300 | 0:0 | 1000 | 0 | 1/10 | 1/50 | 0 | 14 |
| 100 | 400 | 1000:50 | 1000 | 500 | 1/10 | 1/50 | 50 | 20 |
| 100 | 400 | 1000:50 | 1000 | 700 | 1/10 | 1/50 | 70 | 20 |
| 200 | 400 | 300:50 | 1000 | 50 | 1/10 | 1/50 | 10 | 20 |

Adjusting the number of processing units based on the required number of processing units may comprise setting the number of processing units to the of required number processing units at regular or irregular intervals based on e.g., time elapsed, number of tasks processed, number of tasks in processing queue 103, etc. Thus for example, adjusting the number of processing units may comprise setting the number of processing units to the of required number processing units at regular time intervals or every time a certain number of tasks (e.g., 100, 1000, 10000, etc.) is received into processing queue 103.

What is claimed is:

1. A method for concurrently executing ordered and unordered tasks using a plurality of processing units, the method comprising:
   receiving a plurality of tasks into a processing queue, wherein the plurality of tasks includes at least one unordered task and at least one ordered task;
   processing the plurality of tasks in the processing queue using at least one processing unit, wherein:
     when a task from the plurality of tasks is an unordered task, the processing unit processes the task; and
     when a task from the plurality of tasks is an ordered task and another processing unit is processing a related ordered task, the processing unit preprocesses the ordered task; and dynamically managing a number of processing units, comprising:
 determining a required number of processing units based on a rate of unordered tasks being received in the processing queue and a rate of ordered tasks being received in the processing queue; and
 adjusting the number of processing units based on the required number of processing units.

2. The method according to claim 1, wherein ordered and unordered tasks are stored in the same processing queue.

3. The method according to claim 1, wherein the processing queue comprises a linear data structure.

4. The method according to claim 1, comprising:
 determining the required number of processing units further based on a processing rate of unordered tasks.

5. The method according to claim 1, comprising:
 determining the required number of processing units further based on a processing rate of ordered tasks.

6. The method according to claim 1, comprising:
 determining the required number of processing units further based on a number of sets of related ordered tasks in the processing queue.

7. A system for executing ordered and unordered tasks, the system comprising:
 one or more hardware processors; and
 a memory storing instructions that, when executed by the one or more hardware processors, configure the system to:
  receive a plurality of tasks into a processing queue, wherein the plurality of tasks includes at least one unordered task and at least one ordered task;
  process the plurality of tasks in the processing queue using at least one processing unit, wherein:
   when a task from the plurality of tasks is an unordered task, the processing unit processes the task; and
   when a task from the plurality of tasks is an ordered task and another processing unit is processing a related ordered task, the processing unit preprocesses the ordered task; and
  dynamically manage a number of processing units, comprising:
   determine a required number of processing units based on a rate of unordered tasks being received in the processing queue and a rate of ordered tasks being received in the processing queue; and
   adjust the number of processing units based on the required number of processing units.

8. The system of claim 7, wherein ordered and unordered tasks are stored in the same processing queue.

9. The system of claim 7, wherein the processing queue comprises a linear data structure.

10. The system of claim 7, wherein the instructions configure the system to:
 determine the required number of processing units further based on a processing rate of unordered tasks.

11. The system of claim 7, wherein the instructions configure the system to:
 determine the required number of processing units further based on a processing rate of ordered tasks.

12. The system of claim 7, wherein the instructions configure the system to:
 determine the required number of processing units further based on a number of sets of related ordered tasks in the processing queue.

13. A non-transitory computer-readable storage medium for executing ordered and unordered tasks, the computer-readable storage medium including instructions that when executed by one or more hardware processors, cause the one or more hardware processors to:
 receive a plurality of tasks into a processing queue, wherein the plurality of tasks includes at least one unordered task and at least one ordered task;
 process the plurality of tasks in the processing queue using at least one processing unit, wherein:
  when a task from the plurality of tasks is an unordered task, the processing unit processes the task; and
  when a task from the plurality of tasks is an ordered task and another processing unit is processing a related ordered task, the processing unit preprocesses the ordered task; and
 dynamically manage a number of processing units, comprising:
  determine a required number of processing units based on a rate of unordered tasks being received in the processing queue and a rate of ordered tasks being received in the processing queue; and
  adjust the number of processing units based on the required number of processing units.

14. The computer-readable storage medium of claim 13, wherein ordered and unordered tasks are stored in the same processing queue.

15. The computer-readable storage medium of claim 13, wherein the processing queue comprises a linear data structure.

16. The computer-readable storage medium of claim 13, wherein the instructions cause the one or more processors to:
 determine the required number of processing units further based on a processing rate of unordered tasks.

17. The computer-readable storage medium of claim 13, wherein the instructions cause the one or more processors to:
 determine the required number of processing units further based on a processing rate of ordered tasks.

18. The computer-readable storage medium of claim 13, wherein the instructions cause the one or more processors to:
 determine the required number of processing units further based on a number of sets of related ordered tasks in the processing queue.

* * * * *